United States Patent
Kubo et al.

(10) Patent No.: US 7,694,029 B2
(45) Date of Patent: Apr. 6, 2010

(54) DETECTING MISCABLING IN A STORAGE AREA NETWORK

(75) Inventors: Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/461,787

(22) Filed: Aug. 2, 2006

(65) Prior Publication Data

US 2008/0034122 A1 Feb. 7, 2008

(51) Int. Cl.
*G06F 3/00* (2006.01)
(52) U.S. Cl. ............................................. 710/10; 714/8
(58) Field of Classification Search .................. 710/305, 710/10
See application file for complete search history.

(56) References Cited

U.S. PATENT DOCUMENTS

| | | | | |
|---|---|---|---|---|
| 5,615,344 A | * | 3/1997 | Corder | 710/62 |
| 5,812,821 A | * | 9/1998 | Sugi et al. | 703/25 |
| 6,809,505 B2 | * | 10/2004 | Peeke et al. | 324/66 |
| 2003/0021580 A1 | * | 1/2003 | Matthews | 385/147 |
| 2003/0212785 A1 | * | 11/2003 | Jibbe | 709/224 |
| 2005/0150962 A1 | * | 7/2005 | Colombo et al. | 235/492 |
| 2005/0204197 A1 | | 9/2005 | Uddenberg et al. | |
| 2006/0031605 A1 | | 2/2006 | Kao et al. | |
| 2006/0031612 A1 | | 2/2006 | Bashford et al. | |
| 2006/0041699 A1 | | 2/2006 | Day et al. | |
| 2006/0061369 A1 | | 3/2006 | Marks et al. | |
| 2007/0070885 A1 | * | 3/2007 | Uddenberg et al. | 370/225 |
| 2007/0130373 A1 | * | 6/2007 | Kalwitz | 710/8 |
| 2007/0260788 A1 | * | 11/2007 | Blinick et al. | 710/100 |

* cited by examiner

Primary Examiner—Henry W. H. Tsai
Assistant Examiner—Elias Mamo
(74) Attorney, Agent, or Firm—Stephen R. Tkacs; Stephen J. Walder, Jr.; Randall J. Bluestone

(57) ABSTRACT

A mechanism is provided for unique identification of each endpoint in a storage area network interconnect that is bridged by a specialized cable. Each endpoint is capable of querying peer endpoints for a unique identification. Once a unique identifier is obtained for all peer connections to a given endpoint, the endpoint may perform a comparison to validate that the cable connection terminations are connected to valid endpoints. If all endpoints are valid, then the mechanism enables the ports connected to the cable.

16 Claims, 3 Drawing Sheets

DETECTING MISCABLING IN A STORAGE AREA NETWORK

BACKGROUND

1. Technical Field

The present application relates generally to an improved data processing system and method. More specifically, the present application is directed to an apparatus and method to detect miscabling in a storage area network.

2. Description of Related Art

Small computer system interface (SCSI) is a hardware interface that allows for the connection of peripheral devices to a system expansion bus, such as a single peripheral component interconnect (PCI) board called a "SCSI host adapter" that plugs into the motherboard. SCSI uses a bus structure and functions like a miniature local area network (LAN). SCSI allows any two devices to communicate at one time (host to peripheral, peripheral to peripheral). SCSI is widely used in servers, mainframes, and storage area networks (SANs).

Serial attached SCSI (SAS) is a serial version of the SCSI interface. SAS is a point-to-point architecture that uses a disk controller (host bus adapter) to allow one or more channels to operate simultaneously in independent point to point relationships. Emerging SAS storage technology provides for new "starred" topologies in storage subsystems. These new system configurations and how they interconnect provide unfortunate opportunities for miscabled configurations.

SUMMARY

In one illustrative embodiment, a computer program product comprises a computer recordable medium having a computer readable program recorded thereon. The computer readable program, when executed on a computing device, causes the computing device to store configuration information in association with each of a plurality of unique identifiers and detect a new endpoint being connected to a port of an existing endpoint via a specialized cable in a storage area network. The specialized cable includes an identification communications bus. The computer readable program may further cause the computing device to obtain a unique identifier for the new endpoint via the identification communications bus, receive configuration information associated with the unique identifier, and determine whether connection of the new endpoint results in a legal configuration based on the configuration information associated with the unique identifier. The computer readable program may also cause the computing device to disable the port of the existing endpoint responsive to a determination that connection of the new endpoint does not result in a legal configuration.

In another illustrative embodiment, a serial attached small computer systems interface controller card comprises a local processor, firmware that stores configuration information in association with each of a plurality of unique identifiers, an expander that expands to a plurality of channels for a serial attached small computer systems interface port, and an identification communications interface. The local processor detects a new endpoint being connected to a port of an existing endpoint via a specialized cable. The specialized cable includes an identification communications bus. The local processor obtains a unique identifier for the new endpoint via the identification communications bus using the identification communications interface. The local processor receives configuration information associated with the unique identifier from the firmware and determines whether connection of the new endpoint results in a legal configuration based on the configuration information associated with the unique identifier. The local processor disables the expander responsive to a determination that connection of the new endpoint does not result in a legal configuration.

In further illustrative embodiments, the serial attached small computer systems interface controller card may perform one or more of the operations described above with regard to the computer readable program.

In another illustrative embodiment, a method for detecting miscabling in a storage area network is provided. The method comprises storing configuration information in association with each of a plurality of unique identifiers and detecting a new endpoint being connected to a port of an existing endpoint via a specialized cable in the storage area network. The specialized cable includes an identification communications bus. The method further comprises obtaining a unique identifier for the new endpoint via the identification communications bus, receiving configuration information associated with the unique identifier, and determining whether connection of the new endpoint results in a legal configuration based on the configuration information associated with the unique identifier. The method may further comprise disabling the port of the existing endpoint responsive to a determination that connection of the new endpoint does not result in a legal configuration.

In further exemplary embodiments, the method may comprise one or more of the operations described above with regard to the computer readable program.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
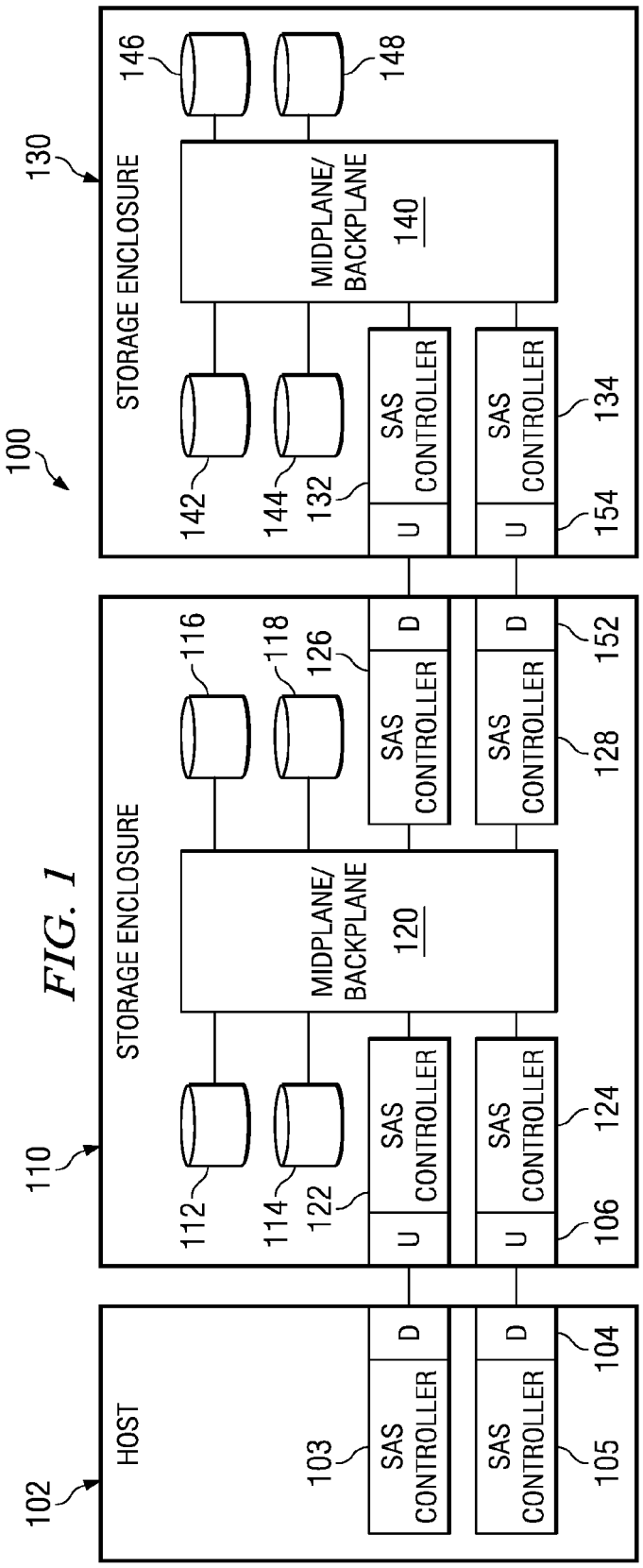
FIG. 1 depicts a pictorial representation of a storage area network data processing environment in which aspects of the illustrative embodiments may be implemented.

With reference now to the figures and in particular with reference to FIG. 1, an exemplary diagram of a data processing environment is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

FIG. 1 depicts a pictorial representation of a storage area network data processing environment in which aspects of the illustrative embodiments may be implemented. Storage area network (SAN) 100 may include a network of computers in which aspects of the illustrative embodiments may be implemented. The SAN 100 contains host 102, which is connected to storage enclosure 110 using serial attached SCSI (SAS) controllers 103, 105. Storage enclosure 110 connects to host 102 using SAS controllers 122, 124. Port 104 of SAS controller 114 is considered a "downstream" port and port 106 of SAS controller 124 is considered an "upstream" port.

Storage enclosure 110 includes midplane/backplane 120, which is connected to storage devices 112-118 and SAS controllers 122-128. A backplane or midplane is an interconnecting device that has sockets into which printed circuit boards may be connected. SAS controllers 126, 128 connect to downstream storage, storage enclosure 130, through downstream ports, such as port 152.

Storage enclosure 130 includes midplane/backplane 140, which is connected to storage devices 142-148 and SAS controllers 132, 134. SAS controllers 132, 134 connect to upstream device, storage enclosure 110, through upstream ports, such as port 154.

Storage area network 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented. For example, SAN 100 may include more or fewer host devices, storage enclosures, storage devices, and controllers, without departing from the spirit and scope of the illustrative embodiments.

In the depicted example, host 102, storage enclosure 110, and storage enclosure 130 are connected using serial attached SCSI (SAS), which is a point-to-point architecture that uses a controller to allow one or more channels to operate simultaneously in independent point to point relationships. Emerging SAS storage technology provides for new "starred" topologies in storage subsystems. These new system configurations and how they interconnect provide unfortunate opportunities for miscabled configurations.

In accordance with an illustrative embodiment, a mechanism is provided for unique identification of each endpoint in a storage area network interconnect that is bridged by a specialized cable. Each endpoint is capable of querying peer endpoints for a unique identification. Once a unique identifier is obtained for all peer connections to a given endpoint, the endpoint may perform a comparison to validate that the cable connection terminations are connected to valid endpoints. If all endpoints are valid, then the mechanism enables the ports connected to the cable.

Figure 2:
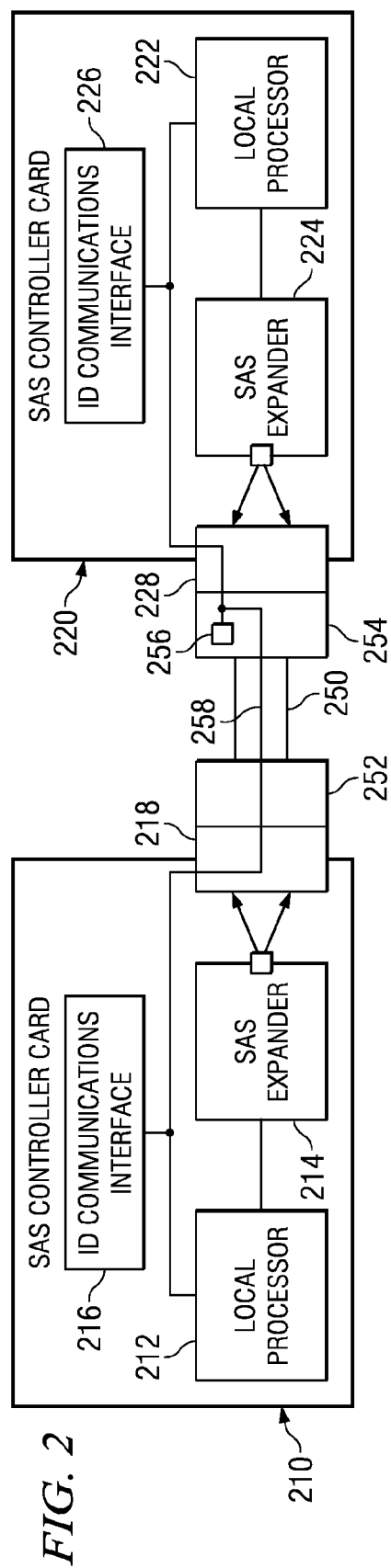
FIG. 2 illustrates an interconnection of endpoints using a specialized cable in accordance with an illustrative embodiment.

FIG. 2 illustrates an interconnection of endpoints using a specialized cable in accordance with an illustrative embodiment. Serial attached SCSI (SAS) controller card 210 is connected to SAS controller card 220. SAS controller card 210 includes local processor 212 and SAS expander 214. Local processor 212, under control of microcode, performs the functions of SAS controller card 210. Microcode may be loaded from firmware (not shown) in a manner generally known in the art. SAS expander 214 allows local processor 212 to connect to a plurality of channels. In one exemplary embodiment, SAS expander 214 expands to four channels; however, SAS expander 214 may expand to more or fewer channels depending on the implementation.

SAS expander 214 provides a plurality of channels to port 218, which is the physical port to which cable 250 connects. Similarly, SAS controller card 220 includes local processor 222 and expander 224, which provides a plurality of channels to port 228. Port 228 is the physical port to which cable 250 connects. SAS controller card 210 connects to SAS controller card 220 via cable 250. Connector 252 of cable 250 connects to port 218 of SAS controller card 210, and connector 254 of cable 250 connects to port 228 of SAS controller card 220.

In accordance with the illustrative embodiment, cable 250 includes identification (ID) communications bus 258. SAS controller card 210 includes ID communications interface 216, which stores a unique ID for SAS controller card 210. ID communications interface 216 also allows local processor 212 to poll peer endpoints for unique IDs through ID communications bus 258, for example.

In one embodiment, ID communications bus 258 may be an inter-IC (I2C) bus. An I2C bus is a two-line bus that is widely used to connect chips together on a printed circuit board. Typically, one chip functions as a master and initiates requests, and all other chips are slaves that respond to the master. In an alternative embodiment, ID communications bus 258 may use 1-wire technology. However, other bus architectures may be used depending on the implementation.

Similarly, SAS controller card 220 includes ID communications interface 226, which stores a unique ID for SAS controller card 220. Cable 250 also includes ID communications interface 256. When SAS controller card 220 is connected to SAS controller card 210, local processor 212 polls ID communications interface 226 of SAS controller card 220 to discover the unique ID of SAS controller card 220.

Firmware of SAS controller 210 may store configuration information associated with unique IDs, such as enclosure type, controller card type, and the like. Local processor 212 may compare the unique ID obtained from SAS controller 220 to the known configuration information to determine whether SAS controller 220 is a valid endpoint. If SAS controller 220 is a valid endpoint, then local processor 212 may enable SAS expander 214. Otherwise, local processor 212 may disable SAS expander 214 and alert an operator of miscabling or invalid configuration.

In one exemplary embodiment, ID communications interface 256 may include an electrically erasable programmable read-only memory (EEPROM). Each endpoint may store its unique within ID communications interface 256, where it is accessible to the other endpoint connected through cable 250. In a further embodiment, local processor 212 may poll ID communications interface 256 for a unique ID of cable 250 to determine if cable 250 is valid for the desired configuration.

Figure 3:
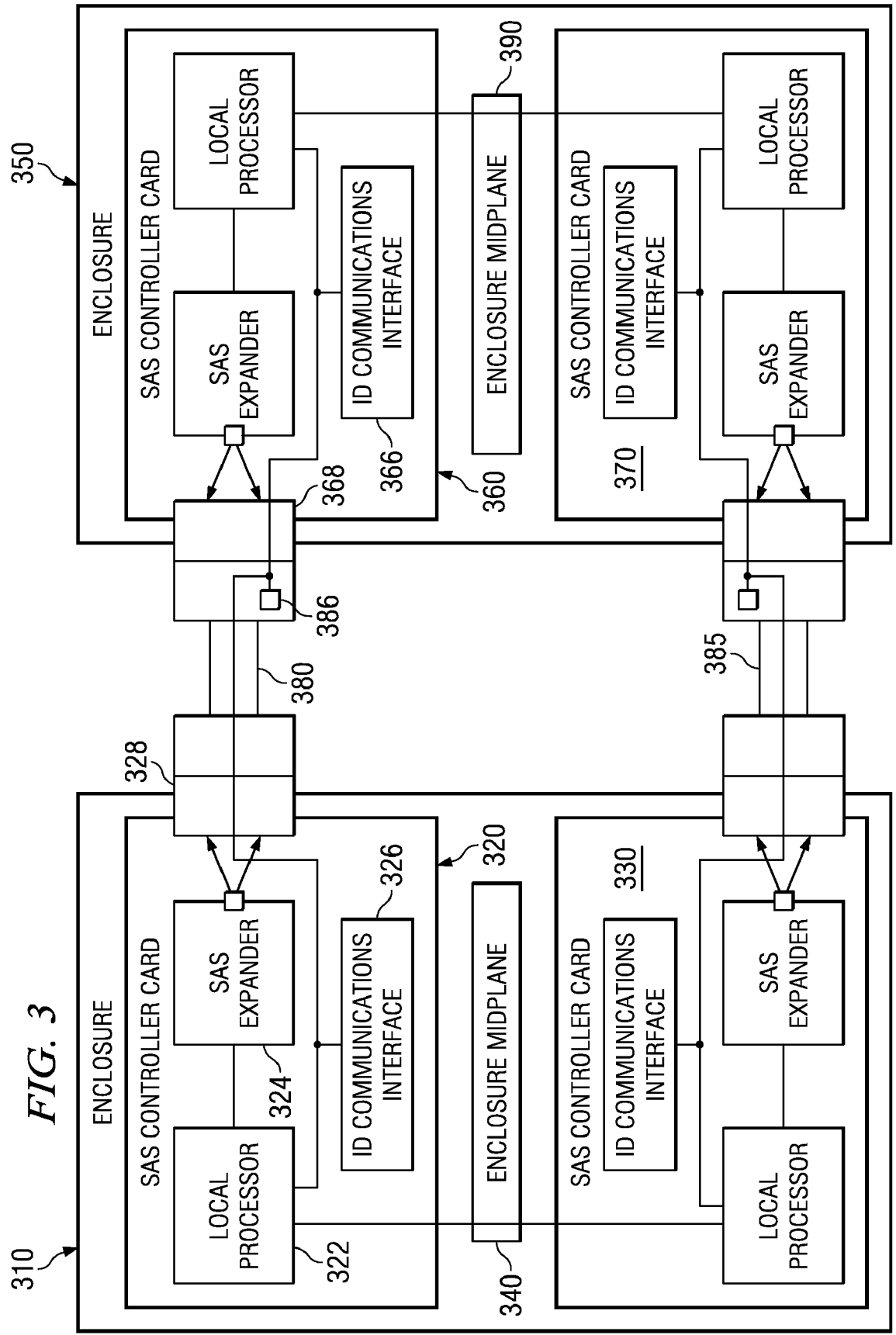
FIG. 3 illustrates storage enclosures connected in a storage area network in accordance with an illustrative embodiment.

FIG. 3 illustrates storage enclosures connected in a storage area network in accordance with an illustrative embodiment. Enclosure 310 includes SAS controller card 320 and SAS controller card 330. Local processor 322 of SAS controller card 320 is connected to the local processor of SAS controller card 330 through enclosure midplane 340.

A unique enclosure, controller card, and port identifier is assigned to each SAS port connection. This information is programmed into the ID communications interface of each SAS controller card by the local processor. For example, ID information for enclosure 310, SAS controller card 320, and port 328 is stored in ID communications interface 326.

Enclosure 350 includes SAS controller card 360 and SAS controller card 370. The local processor of SAS controller card 360 is connected to the local processor of SAS controller card 370 through enclosure midplane 390.

Enclosure 350 is attached to enclosure 310 by connecting port 328 of SAS controller card 320 to port 368 of enclosure 360 using cable 380. Similarly, SAS controller card 330 is connected to SAS controller card 370 using cable 385. In the depicted configuration, enclosure 310 is upstream relative to enclosure 350. Therefore, port 328 is considered a downstream port and port 368 is considered an upstream port.

When enclosure 350 is attached to enclosure 310, local processor 322, for example, queries ID communications interface 366 of SAS controller card 360 to obtain the unique enclosure, controller card, and port identification information. Local processor 322 then performs a comparison to validate the connections that have been made between enclosure 310 and enclosure 350. If the connections are legal, local processor 322 enables SAS expander 324, and SAS controller card 360 enables its SAS expander.

Figure 4:
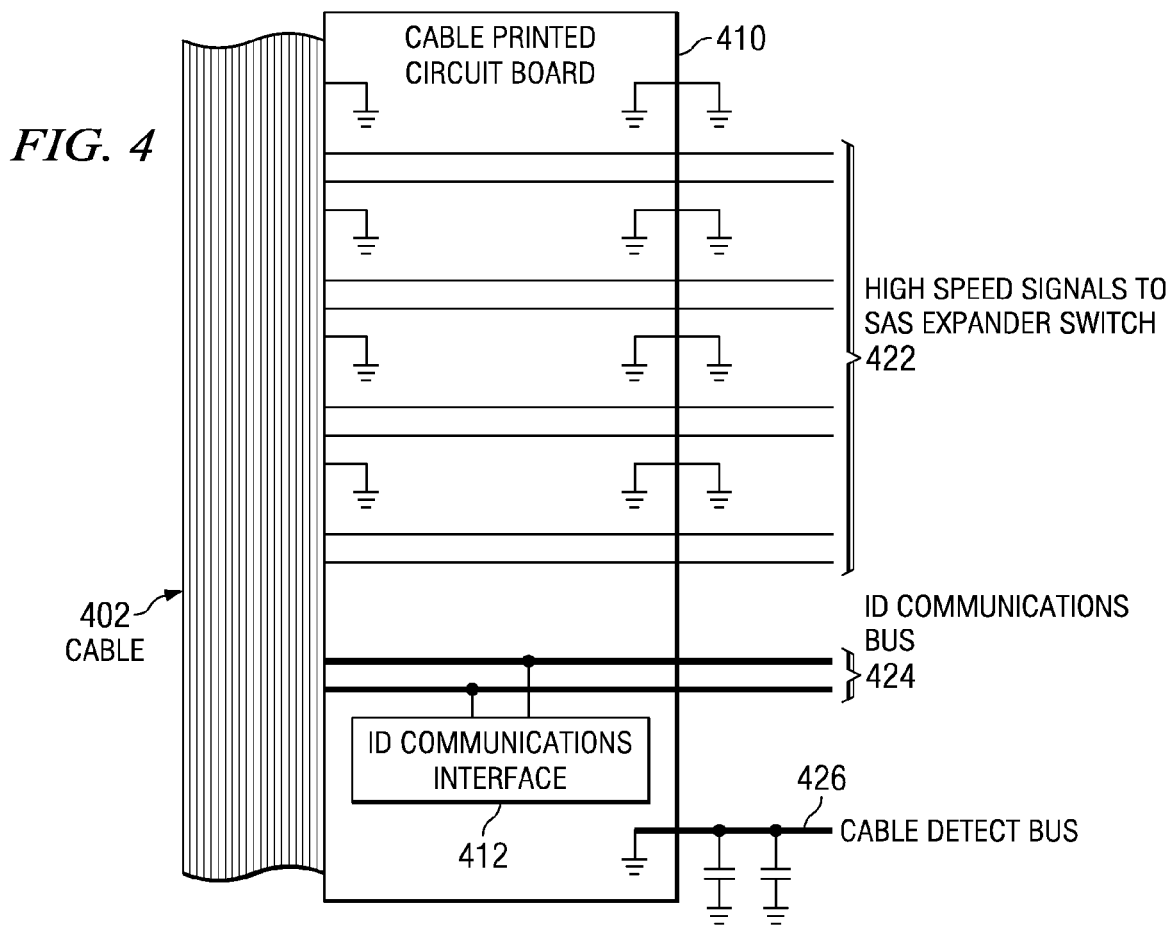
FIG. 4 depicts a port connector for a cable in accordance with an illustrative embodiment.

FIG. 4 depicts a port connector for a cable in accordance with an illustrative embodiment. Cable 402 includes conductors that are connected to cable printed circuit board 410. The conductors include high speed signals to the SAS expander switch 422, ID communications bus 424, and cable detect bus 426. High speed signals 422 provide the communication channels for the SAS controller cards. Cable detect bus 426 provides an indication to the connected SAS controller card that a cable is connected.

ID communications bus 424 provides a communication path from cable 402 to a SAS controller card (not shown). ID communications interface 412 is connected to ID communications bus 424. ID communications interface 412 may include an electrically erasable programmable read-only memory (EEPROM). Each endpoint may store its unique information within ID communications interface 412, via ID communications bus 424, where it is accessible to other endpoints connected through cable 402. In a further embodiment, each SAS controller card may poll ID communications interface 412 for a unique ID of cable 402 to determine if cable 402 is valid for the desired configuration.

In the depicted example, ID communications bus 424 is a two-line bus, such as an I2C bus. In an alternative embodiment, ID communications bus 424 may use 1-wire technology. However, other bus architectures may be used depending on the implementation.

Figure 5:
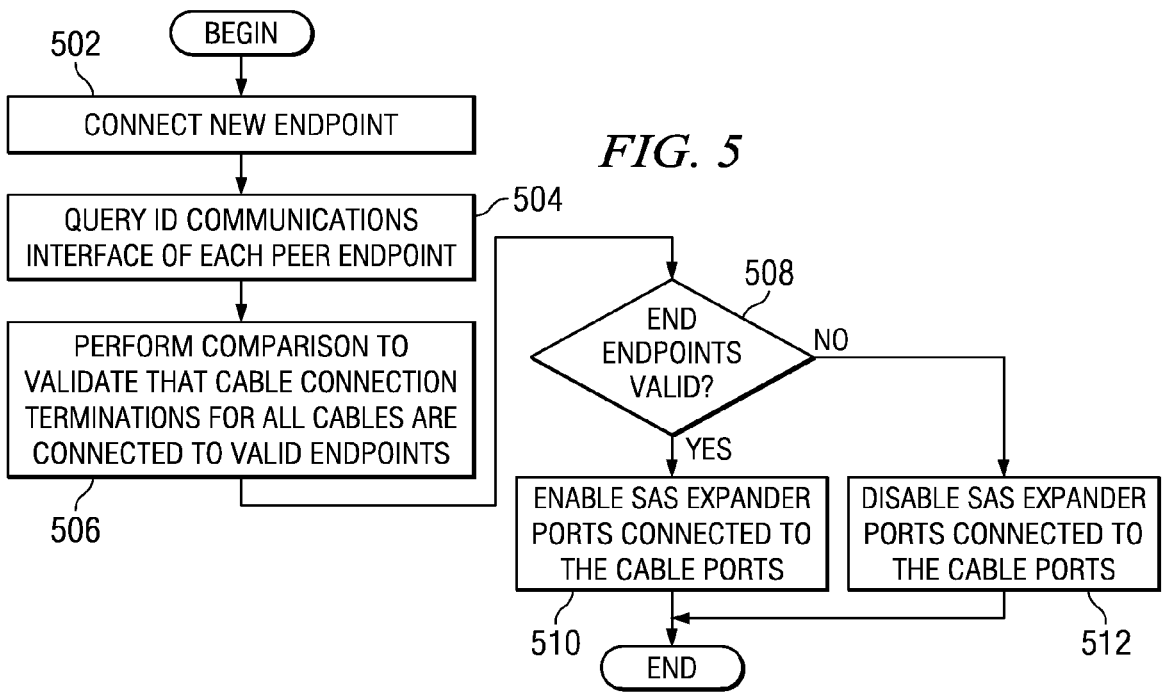
FIG. 5 is a flowchart illustrating operation of a local processor in a controller card in accordance with an illustrative embodiment.

FIG. 5 is a flowchart illustrating operation of a local processor in a controller card in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Now, with reference to FIG. 5, operation begins when one connects a new endpoint to a controller card or enclosure (block 502). The more upstream controller card queries the ID communications interface of each peer endpoint (block 504). Then, the upstream controller card performs a comparison to validate that the cable connection terminations for all cables are connected to valid endpoints (block 506).

Next, the upstream controller card determines whether all endpoints are valid (block 508). If all endpoints are valid, then the upstream controller card enables the SAS expander ports connected to the cable ports (block 510), and operation ends. If at least one endpoint is not valid in block 508, the upstream controller card disables the SAS expander ports connected to the cable ports (block 512), and operation ends.

Thus, the illustrative embodiments solve the disadvantages of the prior art by providing a mechanism for unique identification of each endpoint in a storage area network interconnect that is bridged by a specialized cable. Each endpoint is capable of querying peer endpoints for a unique identification. Once a unique identifier is obtained for all peer connections to a given endpoint, the endpoint may perform a comparison to validate that the cable connection terminations are connected to valid endpoints. If all endpoints are valid, then the mechanism enables the ports connected to the cable.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:
   store configuration information in association with each of a plurality of unique identifiers;
   detect a new endpoint being connected to a port of an existing endpoint via a specialized cable in a storage area network, wherein the specialized cable includes an identification communications bus;
   obtain a unique identifier for the new endpoint via the identification communications bus;
   receive configuration information associated with the unique identifier;
   determine whether connection of the new endpoint results in a legal configuration based on the configuration information associated with the unique identifier; and
   disable the port of the existing endpoint responsive to a determination that connection of the new endpoint does not result in a legal configuration, wherein the specialized cable comprises an identification communications interface, wherein the new endpoint writes the unique identifier to the identification communications interface in the specialized cable, and wherein the computer readable program causes the computing device to obtain the unique identifier by reading the unique identifier from the identification communications interface in the specialized cable.

2. The computer program product of claim 1, wherein the computer readable program further causes the computing device to enable the port of the existing endpoint responsive to a determination that connection of the new endpoint results in a legal configuration.

3. The computer program product of claim 1, wherein the computing device is a serial attached small computer system interface controller card.

4. The computer program product of claim 1, wherein the computer readable program causes the computing device to obtain the unique identifier for the new endpoint by querying an identification communications interface at the new endpoint.

5. The computer program product of claim 1, wherein the computer readable program further causes the computer device to write a unique identifier for the existing endpoint to the identification communications interface in the specialized cable.

6. A serial attached small computer systems interface controller card, comprising:
   a local processor;
   firmware that stores configuration information in association with each of a plurality of unique identifiers;
   an expander that expands to a plurality of channels for a serial attached small computer systems interface port; and
   an identification communications interface,
   wherein the local processor detects a new endpoint being connected to a port of an existing endpoint via a specialized cable, wherein the specialized cable includes an identification communications bus;
   wherein the local processor obtains a unique identifier for the new endpoint via the identification communications bus using the identification communications interface;
   wherein the local processor receives configuration information associated with the unique identifier from the firmware;
   wherein the local processor determines whether connection of the new endpoint results in a legal configuration based on the configuration information associated with the unique identifier; and
   wherein the local processor disables the expander responsive to a determination that connection of the new endpoint does not result in a legal configuration, wherein the specialized cable comprises an identification communications interface, wherein the new endpoint writes the unique identifier to the identification communications interface in the specialized cable, and wherein the local processor obtains the unique identifier by reading the unique identifier from the identification communications interface in the specialized cable.

7. The serial attached small computer systems interface controller card of claim 6, wherein the local processor enables the expander responsive to a determination that connection of the new endpoint results in a legal configuration.

8. The serial attached small computer systems interface controller card of claim 6, wherein the local processor obtains identification information for the new endpoint by querying an identification communications interface at the new endpoint.

9. The serial attached small computer systems interface controller card of claim 6, wherein the local processor writes a unique identifier for the serial attached small computer systems interface controller card to the identification communications interface in the specialized cable.

10. A method for detecting miscabling in a storage area network, the method comprising:
    storing configuration information in association with each of a plurality of unique identifiers;
    detecting a new endpoint being connected to a port of an existing endpoint via a specialized cable in the storage area network, wherein the specialized cable includes an identification communications bus;
    obtaining a unique identifier for the new endpoint via the identification communications bus;
    receiving configuration information associated with the unique identifier;
    determining whether connection of the new endpoint results in a legal configuration based on the configuration information associated with the unique identifier; and
    disabling the port of the existing endpoint responsive to a determination that connection of the new endpoint does not result in a legal configuration, wherein the specialized cable comprises an identification communications interface, wherein the new endpoint writes the unique identifier to the identification communications interface in the specialized cable, and wherein obtaining the unique identifier comprises reading the unique identifier from the identification communications interface in the specialized cable.

11. The method of claim 10, further comprising:
enabling the port of the existing endpoint responsive to a determination that connection of the new endpoint results in a legal configuration.

12. The method of claim 10, wherein obtaining the unique identifier for the new endpoint comprises querying an identification communications interface at the new endpoint.

13. The computer program product of claim 1, wherein the computer readable program further causes the computer device to alert an operator of miscabling responsive to a determination that connection of the new endpoint does not result in a legal configuration.

14. The serial attached small computer systems interface controller card of claim 6, wherein the local processor alerts an operator of miscabling responsive to a determination that connection of the new endpoint does not result in a legal configuration.

15. The method of claim 10, further comprising:
alerting an operator of miscabling responsive to a determination that connection of the new endpoint does not result in a legal configuration.

16. The method of claim 10, wherein the method is performed by a serial attached small computer system interface controller card.

* * * * *